March 6, 1951 T. H. DANIELS 2,544,070
CREAM SEPARATOR AND POURING SPOUT
Filed Jan. 4, 1949
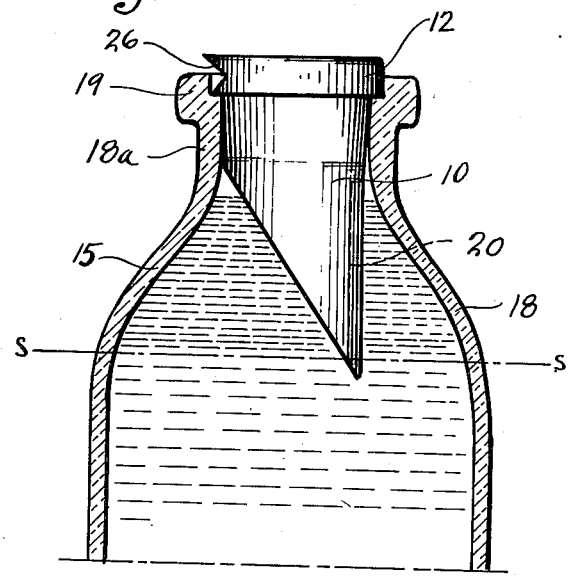
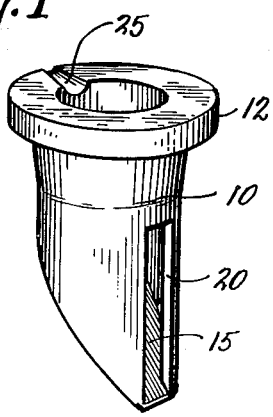
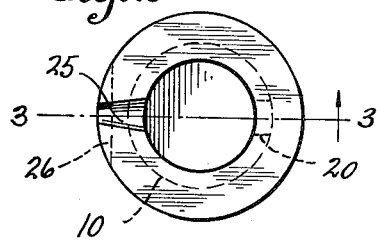
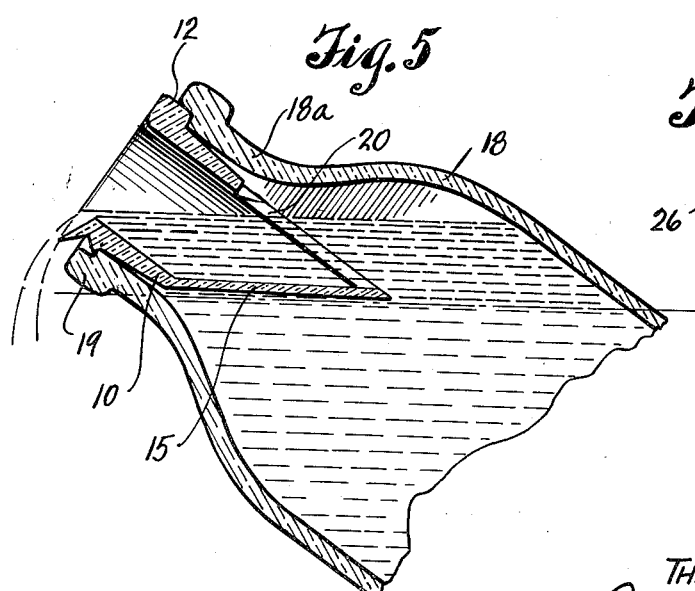
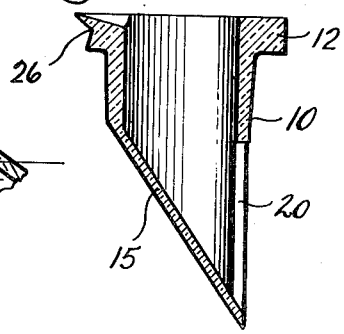
Inventor
THEODORE H. DANIELS
By Cook & Robinson
Attorney Patented Mar. 6, 1951

2,544,070

UNITED STATES PATENT OFFICE 2,544,070

CREAM SEPARATOR AND POURING SPOUT

Theodore H. Daniels, Seattle, Wash.

Application January 4, 1949, Serial No. 69,215

2 Claims. (Cl. 210—51.5)

This invention relates to devices of that class designed to be applied to milk bottles as a means for permitting the pouring off of the cream while restricting any outflow of milk. More particularly, my invention has to do with improvements in a cream separation and pouring device of the above stated character that, in use, is applied within the neck opening of the bottle and which is especially desirable for use with those present day glass bottles that are rectangular in cross-section.

It is the principal object of this invention to provide a novel form of device, which I will refer to as a cream separation and pouring spout, that may be extended down into the bottle through the neck opening and seated against the lip in a liquid-tight fit, and will then serve, upon properly tilting the bottle to pouring position, to permit outflow of cream while restraining the milk.

More specifically stated, the objects of the present invention reside in the provision of a novel form of cream separation and pouring spout, designed for use with certain present day types of milk bottles, and which device is characterized by its comprising a tubular spout or body portion that in use is projected into the bottle through the neck opening, and which spout is terminated at its inner end by a wall that is set at a sharp angle relative to the spout axis, and wherein the tube is equipped at its long side with a longitudinal slot through which the cream will be admitted to the spout while the bottle is held in pouring position.

It is a further object of the invention to provide a cream separation and pouring device that is relatively inexpensive to make; that is simple in its construction; that is easy to apply to the bottle for use and to remove therefrom; that is easy to clean and to keep in a sanitary condition; and which makes possible the pouring off of all cream without any milk being permitted to enter the spout and mix with the cream as it is poured off.

Still further objects of the invention reside in the details of construction of the device; in its combination with the milk bottle and in its mode of use, as will hereinafter be fully described.

In accomplishing the above mentioned and other objects of the invention, I have provided the improved details of construction, the preferred forms of which are illustrated in the accompanying drawings, wherein:

Fig. 1 is a perspective view of a cream separation and pouring device embodied by the present invention.

Fig. 2 is an upper end or plan view of the same.

Fig. 3 is a cross-sectional view of the device taken on the line 3—3 in Fig. 2.

Fig. 4 is a side view of the top portion of a milk bottle, showing the manner of applying the present pouring device thereto.

Fig. 5 is a cross-section of the neck portion of the bottle, with pouring spout applied thereto, and showing the pouring operation.

Referring more in detail to the drawings:

First describing the present device which I have referred to as a cream separation and pouring spout: In its present preferred form of construction the device as seen best in Fig. 1 comprises a tubular body portion 10 of a diameter adapted to be received and to fit snugly within the neck opening of the present day types of square milk bottles. To insure a close fit, the tube may be slightly tapered along its upper end portion to gradually increased diameter, thus to provide that the lower end portion of the tube may be easily and readily inserted in the bottle neck opening, and then the outer end portion will be received in a close fit that is most desirable to prevent leakage while cream is being poured off.

About its outer end, the tubular body 10 is formed with an encircling and outwardly projecting flange 12 adapted, to be seated flatly against the rim portion of the bottle neck as a means for limiting the inward disposition of the device in the bottle. At its lower end, the tubular body terminates in a steep bevel and this end is closed by an end wall 15 that slopes at an angle of about 60 degrees relative to a horizontal plane as is best shown in Fig. 3.

The bottle or container with which the present device is to be used is of that type shown in Figs. 4 and 5 and designated by reference numeral 18. It comprises a constricted neck portion 18a and a rounded lip portion 19 that encircles the bottle at the outer end of the neck.

It is to be understood that the length of the tubular body 10 of the present device is determined by the established or usual level of the cream and milk separation plane in the particular bottle with which the device is to be used. The amount of cream is substantially uniform in all bottles of the same capacity and, in most localities, is established by law or agreement. The length of the tubular body 10 should be such that when the device is inserted into the bottle as in Fig. 4, its lower end will terminate at a predetermined level relative to the milk. Then when the bottle is tilted to easy pouring position, for example to the position shown in Fig. 5, the cream and milk separation plane, designated by the dash and dot line S—S, will be parallel with and approximately at the same level as the lower end wall of the tube.

Formed in the tubular body 10 lengthwise thereof and at its longest side, is a slot or opening 20. This extends from the lower end wall upwardly to about half the distance to the upper end, and it is through this slot that the cream flows from the bottle into the pouring spout during the pouring operation.

To use the device, it is applied within the bottle as illustrated in Figs. 4 and 5, with its upper end flange seated against the rim or lip of the neck and the upper end portion of the tubular body fitted in the neck opening and the beveled lower end of the body extending substantially to the cream and milk separation line. To pour off the cream, the bottle is then tilted in a direction that is directly opposite the slotted side of the tubular body of the spout, as has been illustrated in Fig. 5. By so tilting the bottle, the lower end wall of the tube will be brought substantially level with the plane of the milk and cream separation line and the cream will flow into the spout through the slot 20 but the milk will be restrained from flowing out with the cream.

If the milk level should be somewhat higher or lower than that for which the spout is designed, a very accurate cream separation can still be made merely by noting the milk level and then tilting the bottle accordingly to bring it up to the lower end tip of the tube.

As a non-drip feature, I have provided the flange portion 12 of the device with a cross channel 25 at a location that is aligned with the shorter portion of the tubular body, and have undercut the flange as at 26 in Fig. 3, to form a sharp lip across which the cream is poured. When the bottle is in pouring position, the cream has no tendency to run down the flange onto the bottle.

Pouring spouts of this character are preferably made of plastic, and molded or otherwise formed. However, they may be made of glass, metal and other suitable materials and sizes and proportions changed to meet requirements.

Such devices have been found to be easy to use, and very satisfactory in their use, especially where that use is in connection with square bottles, from which, by reason of their form, it is very difficult to pour off the cream from the milk without pouring off a substantial amount of milk with it.

Having thus described my invention, what I claim as new therein and desire to secure by Letters Patent is:

1. A device of the character described comprising a tubular spout adapted to be extended into a milk bottle through the neck opening thereof and designed at its upper end to form a liquid-tight fit with the bottle rim; said tube being open at its outer end and terminating at its inner end in a steep bevel and closed at that end by a correspondingly sloped end wall; and said tube having a longitudinal opening of substantial length along its lower end portion and at the longer side thereof extending upwardly from the tip of the tube.

2. A device as recited in claim 1 wherein the said tubular spout is slightly outwardly flared along its outer end portion to be received in the bottle neck in a wedging fit and is equipped about its outer end with an encircling flange adapted to engage in tight connection with the bottle rim and said flange being formed thereacross with a pouring channel that is aligned with the shorter side of the tubular body.

THEODORE H. DANIELS.

REFERENCES CITED

The following references are of record in the file of this patent:

UNITED STATES PATENTS

| Number | Name | Date |
| --- | --- | --- |
| 823,986 | Bartram | June 19, 1906 |
| 1,598,230 | Zirbel | Aug. 31, 1926 |
| 2,008,254 | Kusche | July 16, 1935 |
| 2,222,594 | Metcalf | Nov. 26, 1940 |